Patented Mar. 10, 1953

2,631,154

UNITED STATES PATENT OFFICE 2,631,154

1 - (HYDROXYALKYLAMINOALKYLAMINO)- 4-METHYLXANTHONES AND THEIR PREPARATION

Sydney Archer, Albany, N. Y., assignor to Sterling Drug Inc., New York, N. Y., a corporation of Delaware No Drawing. Application January 31, 1952, Serial No. 269,353

20 Claims. (Cl. 260—335)

This invention relates to 1-(hydroxyalkylaminoalkylamino)-4-methylxanthones and to their preparation. In particular, it relates to xanthones having the structural formula

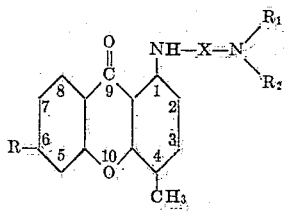

where R is hydrogen, a halo group, a lower alkyl radical or a lower alkoxy radical, X is a lower alkylene radical having its two connecting linkages on adjacent carbon atoms, $R_1$ is hydrogen or a lower alkyl radical and $R_2$ is a lower 2-hydroxyalkyl radical. The compounds of my invention are useful as chemotherapeutic agents, for instance, as agents for treating schistosomiasis.

In the above structural formula R, when halo, means chloro, bromo, iodo and fluoro. R, when lower alkyl, and $R_1$, when lower alkyl, each have preferably from 1–4 carbon atoms inclusive, including such radicals as methyl, ethyl, n-propyl, isopropyl, n-butyl, isobutyl and 2-butyl. R, when lower alkoxyl, has preferably from 1–4 carbon atoms inclusive, including such radicals as methoxy, ethoxy, n-propoxy, isopropoxy, n-butoxy, isobutoxy and 2-butoxy. $R_2$, the lower 2-hydroxyalkyl has a hydroxy group attached to the carbon atom that is one carbon atom removed from the side chain nitrogen atom, and of such 2-hydroxyalkyl radicals, those having 2–4 carbon atoms inclusive are preferred, such as 2-hydroxyethyl, 2-hydroxypropyl, 2-hydroxy-2-methylpropyl, 2-hydroxybutyl, and the like. The lower alkylene radical, designated hereinabove as X, has preferably from 2–4 carbon atoms inclusive. X thus is such radicals as —CH$_2$CH$_2$—, —CH(CH$_3$) CH$_2$—, —CH$_2$CH(CH$_3$)—,
—CH(CH$_3$) CH(CH$_3$)— and —CH(C$_2$H$_5$) CH$_2$—

My compounds are prepared by heating, preferably in refluxing pyridine at atmospheric pressure, a hydroxyalkylaminoalkylamine having the formula, $R_1R_2N$—X—NH$_2$, with a 1-halo-4-methylxanthone having the formula

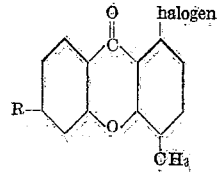

where R, $R_1$, $R_2$ and X have the meanings defined hereinabove and halogen means chloro, bromo, iodo and fluoro.

Illustrations of the compounds and process of my invention are the preparation of: 1-[2-(2-hydroxyethylamino)ethylamino] - 4 - methyl -6-iodoxanthone hydrochloride by heating 2-(2-hydroxyethylamino)ethylamine with 1-chloro-4-methyl-6-iodoxanthone; 1-[2-(N-n-butyl-N-2-hydroxypropylamino)ethylamino]- 4 -methyl-6-ethylxanthone hydrobromide by heating 2-(N-n-butyl-N-2-hydroxypropylamino)ethylamine with 1-bromo-4-methyl-6-ethylxanthone; and 1-[1-(N-ethyl-N- 2 -hydroxyethylamino) - 2 - propylamino]-4-methyl-6-isobutoxyxanthone hydroiodide by heating 1-(N-ethyl-N-2-hydroxyethylamino)-2-propylamine with 1-iodo-4-methyl-6-isobutoxyxanthone.

My 1 - (hydroxyalkylaminoalkylamino) - 4 - methylxanthones are therapeutically active whether employed as the free bases or as their salts with relatively non-toxic organic or inorganic acids, although in most cases the salt form is more convenient to employ. I found it convenient to isolate my compounds as the hydrohalides, especially the hydrochlorides. However, other acid addition salts are within the scope of my invention, such salts including the phosphates, sulfates, citrates, ethanesulfonates, tartrates, succinates, acetates, benzoates, mandelates, oleates, and the like.

Specific embodiments of my invention are further illustrated in the following examples:

EXAMPLE 1

A. N-ethyl-N-2-hydroxy-2-methylpropylamine

To a solution of ethylamine in methanol (1450 ml. of 25.6%) which was cooled to 5° C., there was added dropwise with stirring 144 g. of isobutylene oxide. The temperature rose to 40° C. during the addition. The mixture was stirred for sixteen hours at room temperature and then distilled. The product, N-ethyl-N-2-hydroxy-2-methylpropylamine, boiled at 76–77° C. at 40 mm. and weighed 177 g. (77%).

Anal. calcd. for $C_6H_{15}NO$: N, 11.95. Found: N, 11.58.

B. 2-(N-ethyl-N-2-hydroxy-2-methylpropylamino)ethylamine

A mixture of 170 g. of 2-bromoethylphthalimide, 174 g. of N-ethyl-N-2-hydroxy-2-methylpropylamine and 425 ml. of dry xylene was refluxed for seven hours. The mixture was cooled and filtered. The filtrate was concentrated to remove xylene and the residue was dissolved in 650 ml. of ethanol. The solution was heated with stirring and treated with 53 g. of 85% hydrazine hydrate. After three hours the mixture was concentrated to dryness. The complex was dissolved in water and made acid with hydrochloric acid. The phthalhydrazide was collected, pressed dry and washed with a liberal quantity of ethanol. The combined filtrates were taken to dryness and the residue of diamine hydrochloride was dissolved in a minimum quantity of water and then treated with solid potassium hydroxide until separation of the oil layer was complete. The oil layer was then removed and the aqueous phase was extracted with ether. The oil layer was combined with the ether extracts and the resulting ether solution was dried over potassium hydroxide and distilled. The product, 2-(N-ethyl-N-2-hydroxy-2-methylpropylamino)-ethylamine, boiled at 79–80° C. at 3.0 mm.

Anal. calcd. for $C_8H_{20}N_2O$: N, 17.47. Found: N, 17.21.

C. *1-[2 - (N-ethyl-N-2-hydroxy-2-methylpropylamino) ethylamino]-4-methyl - 6 - chloroxanthone*

A mixture of 7.0 g. of 1,6-dichloro-4-methylxanthone, 6.0 g. of 2-(N-ethyl-N-2-hydroxy-2-methylpropylamino) ethylamine and 6.0 ml. of dry pyridine was refluxed overnight. To the reaction mixture was added 3 ml. of 50% potassium hydroxide and the resulting mixture was distilled. The residue was cooled, diluted with water and taken up in chloroform. The chloroform was removed by distilling in vacuo and the residue was boiled with dilute acetic acid, and the acid solution was filtered to remove the unreacted 1,6-dichloro-4-methylxanthone. The filtrate was made basic with 35% aqueous sodium hydroxide and the product that separated was extracted with chloroform. After the chloroform had been removed by distilling in vacuo, the residue was taken up in absolute ethanol and the ethanolic solution was treated with ethanolic hydrogen chloride and absolute ether. The gummy hydrochloride which separated crystallized on standing. It was recrystallized twice from absolute ethanol-ether, yielding the product, 1-[2-(N-ethyl-N-2-hydroxy - 2 - methylpropylamino) ethylamino]-4-methyl-6-chloroxanthone as the hydrochloride, M. P. 210.4–212.4° C. (cor.).

Anal. calcd. for $C_{22}H_{27}ClN_2O_3 \cdot HCl$: N, 6.38; Cl, 16.14. Found: N, 6.20; Cl, 15.99.

1-[2-(N - ethyl-N-2-hydroxy-2-methylpropylamino) ethylamino]-4 - methyl-6-chloroxanthone in free base form is obtained by treating an aqueous solution of its hydrochloric with alkali, e. g., 35% aqueous solution of sodium hydroxide, extracting the product thereby liberated with chloroform and removing the chloroform by distilling in vacuo.

When 1-chloro-4,6-dimethylxanthone or 1-chloro-4-methyl-6-methoxyxanthone is used instead of 1,6-dichloro-4-methylxanthone in the foregoing preparation, the resulting product is 1-[2-(N-ethyl-N-2-hydroxy - 2 - methylpropylamino) ethylamino]-4,6-dimethylxanthone or 1-[2-(N-ethyl-N-2-hydroxy-2-methylpropylamino) ethylamino]-4-methyl-6-methoxyxanthone, respectively.

Other 1-[2-(N-ethyl-N-2-hydroxy-2-methylpropylamino) ethylamino]-4 - methyl-6-haloxanthones can be prepared according to the procedure given above, but using other 1,6-dihalo-4-methylxanthone in place of 1,6-dichloro-4-methylxanthone. Thus, using 1,6-dibromo-4-methylxanthone or 1-chloro-4-methyl-6-bromoxanthone there is obtained 1-[2-(N-ethyl-N-2-hydroxy - 2 - methylpropylamino) ethylamino]-4-methyl-6-bromoxanthone in the form of its hydrobromide or hydrochloride addition salts, respectively. Using 1,6-diiodo-4-methylxanthone or 1-chloro-4-methyl-6-iodoxanthone there is obtained 1-[2-(N-ethyl-N-2-hydroxy-2-methylpropylamino) ethylamino]-4-methyl-6-iodoxanthone in the form of its hydroiodide or hydrochloride addition salts, respectively.

EXAMPLE 2

A. *N-n-butyl-N-2-hydroxypropylamine*

A solution of 145 g. of n-butylamine and 400 ml. of methanol was heated to reflux. The source of heat was removed and 112 g. of propylene oxide was added at such a rate that gentle reflux was maintained. After all of the oxide had been added, the solution was heated for an additional hour and then distilled, first at atmospheric pressure to remove the solvent and then at 20 mm. The fraction, boiling at 98–100° C. and weighing 134 g. (52%), was the desired product, N-n-butyl-N-2-hydroxypropylamine.

Anal. calcd. for $C_7H_{17}NO$: N, 10.67. Found: N, 10.62.

There was also obtained 75 g. of a higher boiling oil which presumably was the tertiary-amine, N,N-di-n-butyl-N'-2-hydroxypropylamine.

B. *2-(N-n-butyl-N-2-hydroxypropylamino) ethylamine*

A mixture of 102 g. of 2-bromoethylphthalimide, 109 g. of N-n-butyl-N-2-hydroxypropylamine and 240 ml. of dry xylene was refluxed for ten hours. The mixture was cooled and filtered. The filtrate was concentrated to remove xylene and the residue dissolved in 400 ml. of ethanol. The solution was heated to boiling with stirring and treated with 32 g. of 85% hydrazine hydrate. After three hours the mixture was concentrated to dryness. The complex was dissolved in water and made acid with hydrochloric acid. The phthalhydrazide was filtered, pressed dry and washed with a liberal quantity of water. The combined filtrates were taken to dryness. The residue of diamine hydrochloride was dissolved in a minimum quantity of water and then treated with solid potassium hydroxide until the oil layer which separated did not increase in size. The oil layer was removed and the aqueous phase extracted with ether. The combined organic layers were dried over potassium hydroxide and distilled. The product, 2-(N-n-butyl-N - 2 - hydroxypropylamino) ethylamine, boiled at 109–111° C. (3 mm.) and weighed 35 g. (53%).

Anal. calcd. for $C_9H_{22}N_2O$: N, 16.07. Found: N, 15.93.

C. *1-[2-(N-n-butyl-N - 2 - hydroxypropylamino) ethylamino]-4-methyl-6-chloroxanthone*

This preparation was carried out following the procedure given in Example 1C, but using 5.7 g. of 1,6-dichloro-4-methylxanthone, 5.7 g. of 2-(N-n-butyl-N - 2 - hydroxypropylamino) ethylamine and 5.5 ml. of dry pyridine. The product, 1-[2-(N-n-butyl-N - 2 - hydroxypropylamino) ethylamino]-4-methyl-6-chloroxanthone as the hydrochloride, sintered at about 112° C. and then melted at 138–143° C. (cor.) when recrystallized from absolute ethanol-absolute ether.

Anal. calcd. for $C_{23}H_{29}ClN_2O_3 \cdot HCl$: N, 6.18; Cl, 15.64. Found: N, 5.90; Cl, 15.68.

EXAMPLE 3

A. 2-(N-methyl-N-2-hydroxypropylamino)ethylamine

This preparation was carried out following the procedure given in Example 2B, but using 204 g. of 2-bromoethylphthalimide, 148 g. of N-methyl-N-(2-hydroxypropyl)amine and 500 ml. of dry xylene with a reflux period of seven hours. The product, 2-(N-methyl-N-2-hydroxypropylamino)ethylamine, boiled at 81–83° C. (2.0 mm.) and weighed 60.0 g.

Anal. calcd. for $C_6H_{16}N_2O$: N, 21.20. Found: N, 20.50.

B. 1-[2-(N-methyl-N-2-hydroxypropylamino)ethylamino]-4-methyl-6-chloroxanthone This preparation was carried out according to the procedure described hereinabove in Example 1C, but using 6.4 g. of 1,6-dichloro-4-methylxanthone, 6.0 g. of 2-(N-methyl-N-2-hydroxypropylamino)ethylamine and 6.0 ml. of dry pyridine. The product, 1-[2-(N-methyl-N-2-hydroxypropylamino)ethylamino]-4-methyl-6-chloroxanthone in the form of its hydrochloride, melted at 216–218° C. (cor.) when recrystallized from absolute ethanol.

Anal. calcd. for $C_{20}H_{23}ClN_2O_3 \cdot HCl$: C, 58.40; H, 5.88; N, 6.81. Found: C, 58.63; H, 5.96; N, 6.84.

EXAMPLE 4

A. N-ethyl-N-2-hydroxyethylaminoacetone

This preparation was carried out using a modification of the method of Breslow et al. [JACS 68, 100 (1946)]. A solution of 125 g. of N-ethyl-N-2-hydroxyethylamine and 75 ml. of ether was added dropwise to a warmed solution of 63 g. of chloroacetone and 75 ml. of ether. The addition required one hour. The mixture was then refluxed for three hours more, after which time the N-ethyl-N-2-hydroxyethylamine hydrochloride had separated as an oily layer. After the amine salt layer had been removed, the ether layer was distilled, yielding the product, N-ethyl-N-2-hydroxyethylaminoacetone, which distilled at 48–49° C. at 1 mm. and weighed 56 g. (54%).

Anal. calcd. for $C_7H_{15}NO_2$: N, 9.60. Found: N, 10.06.

B. 1-(N-ethyl-N-2-hydroxyethylamino)-2-propylamine

A solution of 94 g. of N-ethyl-N-2-hydroxyethylaminoacetone in 500 ml. of 15% methanolic ammonia was hydrogenated at 70° C. at 450 p.s.i. in the presence of Raney nickel catalyst. Reduction was complete in seven hours. The catalyst was filtered off and the filtrate distilled. After a forerun of 18.4 g., B. P. 64–69° C. (0.4 mm.), there was obtained 56.3 g. (59%) of the pure diamine, 1-(N-ethyl-N-2-hydroxyethylamino)-2-propylamine, B. P. 69–70.5° C. (0.4 mm.).

Anal. calcd. for $C_7H_{18}N_2O$: N, 19.27. Found: N, 19.01.

C. 1-[1-(N-ethyl-N-2-hydroxyethylamino)-2-propylamino]-4-methyl-6-chloroxanthone This preparation can be carried out following the directions given hereinabove in Example 1C, but using 7.0 g. of 1,6-dichloro-4-methylxanthone, 6.0 g. of 1-(N-ethyl-N-2-hydroxyethylamino)-2-propylamine and 6.0 ml. of dry pyridine. The product obtained is 1-[1-(N-ethyl-N-2-hydroxyethylamino)-2-propylamino]-4-methyl-6-chloroxanthone as the hydrochloride.

Other 1-[1-(N-ethyl-N-2-hydroxyethylamino)-2-propylamino]-4-methylxanthones can be prepared according to the above procedure, using other 1-halo-4-methylxanthones in place of 1,6-dichloro-4-methylxanthone. Thus, 1-[1-(N-ethyl-N-2-hydroxyethylamino)-2-propylamino]-4-methylxanthone, 1-[1-(N-ethyl-N-2-hydroxyethylamino)-2-propylamino]-4,6-dimethylxanthone and 1-[1-(N-ethyl-N-2-hydroxyethylamino)-2-propylamino]-4-methyl-6-methoxyxanthone are formed using 1-chloro-4-methylxanthone, 1-chloro-4,6-dimethylxanthone and 1-chloro-4-methyl-6-methoxyxanthone, respectively.

EXAMPLE 5

A. 2-(N-n-butyl-N-2-hydroxyethylamino)ethylamine

This preparation was carried out according to the procedure described hereinabove in Example 2B, but using 51. g. of 2-bromoethylphthalimide, 47.5 g. of N-n-butyl-N-2-hydroxyethylamine and 120 ml. of dry xylene, with a reflux period of ten hours. The product, 2-(N-n-butyl-N-2-hydroxyethylamino)ethylamine, boiled at 145–147.5° C. at 21 mm.

Anal. calcd. for $C_8H_{20}N_2O$: N, 17.42. Found: N, 17.08.

B. 1-[2-(N-n-butyl-N-2-hydroxyethylamino)-ethylamino]-4-methyl-6-chloroxanthone This compound can be prepared following the procedure described hereinabove in Example 1C, but using 7.0 g. of 1,6-dichloro-4-methylxanthone 6.0 g. of 2-(N-n-butyl-N-2-hydroxyethylamino)ethylamine and 6.0 ml. of dry pyridine. The product thus obtained is 1-[2-(N-n-butyl-N-2-hydroxyethylamino)ethylamino]-4-methyl-6-chloroxanthone, as the hydrochloride.

Other 1-[2-(N-n-butyl-N-2-hydroxyethylamino)ethylamino]-4-methylxanthones can be prepared according to the above procedure, using other 1-halo-4-methylxanthones in place of 1,6-dichloro-4-methylxanthone. Thus, 1[2-(N-n-butyl-N-2-hydroxyethylamino)ethylamino]-4-methylxanthone, 1-[2-(N-n-butyl-N-2-hydroxyethylamino)ethylamino]-4,6-dimethylxanthone and 1-[2-(N-n-butyl-N-2-hydroxyethylamino)-ethylamino]-4-methyl-6-methoxyxanthone are formed using 1-chloro-4-methylxanthone, 1-chloro-4,6-dimethylxanthone and 1-chloro-4-methyl-6-methoxyxanthone, respectively.

EXAMPLE 6

A. 2-(N-ethyl-N-2-hydroxyethylamino)ethylamine

This preparation was carried out following the procedure described hereinabove in Example 2B, but using 130 g. of 2-bromoethylphthalimide, 98 g. of N-ethyl-N-2-hydroxyethylamine and 310 ml. of dry xylene. The product, 2-(N-ethyl-N-2-hydroxyethylamino)ethylamine, distilled at 74–75° C. (0.7 mm.) and weighed 30.2 g. (45%).

Anal. calcd. for $C_6H_{16}N_2O$: N, 21.20. Found: N, 21.10.

B. 1-[2-(N-ethyl-N-2-hydroxyethylamino)-ethyl-amino]-4-methyl-6-chloroxanthone This preparation was carried out following the procedure described hereinabove in Example 1C, but using 3.8 g. of 1,6-dichloro-4-methylxanthone, 3.8 g. of 2-(N-ethyl-N-2-hydroxyethylamino)ethylamine and 3.8 ml. of dry pyridine.

The product, 1-[2-(N-ethyl-N-2-hydroxyethylamino)ethylamino]-4-methyl-6-chloroxanthone, obtained as the hydrochloride, melted at 202.7–203.5° C. (cor.).

Anal. calcd. for $C_{20}H_{23}ClN_2O_3 \cdot HCl$: C, 58.40; H, 5.88; N, 6.81. Found: C, 58.46; H, 6.04; N, 6.80.

When the above procedure is followed but using 1,6-diiodo-4-methylxanthone or 1-chloro-4-methyl-6-iodoxanthone in place of 1,6-dichloro-4-methylxanthone, there is obtained 1-[2-(N-ethyl-N-2-hydroxyethylamino)ethylamino]-4-methyl-6-iodoxanthone in the form of its hydroiodide or hydrochloride addition salt, respectively.

EXAMPLE 7

1-[2-(N-ethyl-N-2-hydroxyethylamino)ethylamino]-4,6-dimethylxanthone

This compound was prepared according to the directions given above in Example 1C, but using 5.5 g. of 1-chloro-4,6-dimethylxanthone, 5.0 g. of 2-(N-ethyl-N-2-hydroxyethylamino)ethylamine and 5.0 ml. of dry pyridine. The product, 1-[2-(N-ethyl-N-2-hydroxyethylamino)ethylamino]-4,6-dimethylxanthone, as the hydrochloride, melted at 197.4–199.3° C. (cor.) when recrystallized from absolute ethanol.

Anal. calcd. for $C_{21}H_{26}N_2O_3 \cdot HCl$: C, 64.52; H, 6.96; N, 7.17. Found: C, 64.44; H, 6.94; N, 6.96.

Other 1-[2-(N-ethyl-N-2-hydroxyethylamino)ethylamino]-4-methyl-6-alkylxanthones can be prepared following the directions given above but using other 1-halo-4-methyl-6-alkylxanthones in place of 1-chloro-4,6-dimethylxanthone. Thus, using 1-bromo-4-methyl-6-ethylxanthone, 1-iodo-4-methyl-6-isopropylxanthone, 1-chloro-4-methyl-6-n-butylxanthone and 1-chloro-4-methyl-6-isobutylxanthone, there is obtained 1-[2-(N-ethyl-N-2-hydroxyethylamino)-ethylamino]-4-methyl-6-ethylxanthone hydrobromide, 1-[2-(N-ethyl-N-2-hydroxyethylamino)ethylamino]-4-methyl-6-isopropylxanthone hydroiodide, 1-[2-(N-ethyl-N-2-hydroxyethylamino)ethylamino]-4-methyl-6-n-butylxanthone hydrochloride and 1-[2-(N-ethyl-N-2-hydroxyethylamino)ethylamino]-4-methyl-6-isobutylxanthone hydrochloride, respectively.

EXAMPLE 8

1-[2-(N-ethyl-N-2-hydroxyethylamino)ethylamino]-4-methyl-6-bromoxanthone

This preparation was carried out according to the procedure described above in Example 1C, but using 7.0 g. of 1-chloro-4-methyl-6-bromoxanthone, 6.7 g. of 2-(N-ethyl-N-2-hydroxyethylamino)ethylamine and 6.5 ml. of dry pyridine. The product, 1-[2-(N-ethyl-N-2-hydroxyethylamino)ethylamino]-4-methyl-6-bromoxanthone, as the hydrochloride, melted at 200.8–203.4° C. (cor.) when recrystallized from absolute ethanol.

Anal. calcd. for $C_{20}H_{23}BrN_2O_3 \cdot HCl$: C, 52.70; H, 5.31; N, 6.15. Found: C, 52.46; H, 5.08; N, 6.31.

EXAMPLE 9

1-[2-(N-ethyl-N-2-hydroxyethylamino)ethylamino]-4-methyl-6-bromoxanthone

This compound was prepared following the procedure described above in Example 1C, but using 6.0 g. of 1-chloro-4-methyl-6-methoxyxanthone, 4.8 g. of 2-(N-ethyl-N-2-hydroxyethylamino)-ethylamine and 6 ml. of dry pyridine. The product, 1-[2-(N-ethyl-N-2-hydroxyethylamino)-ethylamino]-4-methyl-6-methoxyxanthone, in the form of the hydrochloride, melted at 185.5–188.0° C. (cor.) when recrystallized from absolute ethanol.

Anal. calcd. for $C_{21}H_{26}N_2O_4 \cdot HCl$: N, 6.89; Cl, 8.71. Found: N, 6.86; Cl, 8.90.

Other 1-[2-(N-ethyl-N-2-hydroxyethylamino)ethylamino]-4-methyl-6-alkoxyxanthones can be prepared according to the procedure given above, but using other 1-halo-4-methyl-6-alkoxyxanthones in place of 1-chloro-4-methyl-6-methoxyxanthone. Thus, using 1-bromo-4-methyl-6-ethoxyxanthone, 1-iodo-4-methyl-6-n-propoxyxanthone, 1-chloro-4-methyl-6-isobutoxyxanthone and 1-chloro-4-methyl-6-n-butoxyxanthone, there is obtained 1-[2-(N-ethyl-N-2-hydroxyethylamino)ethylamino]-4-methyl-6-ethoxyxanthone hydrobromide, 1-[2-(N-ethyl-N-2-hydroxyethylamino)ethylamino]-4-methyl-6-n-propoxyxanthone hydroiodide, 1-[2-(N-ethyl-N-2-hydroxyethylamino)ethylamino]-4-methyl-6-isobutoxyxanthone hydrochloride and 1-[2-(N-ethyl-N-2-hydroxyethylamino)-ethylamino]-4-methyl-6-n-butoxyxanthone hydrochloride, respectively.

EXAMPLE 10

1-[2-(N-ethyl-N-2-hydroxyethylamino)ethylamino]-4-methylxanthone

This preparation was carried out following the procedure described above in Example 1C, but using 6.0 g. of 1-chloro-4-methylxanthone, 6.0 g. of 2-(N-ethyl-N-2-hydroxyethylamino)ethylamine and 6.0 ml. of dry pyridine. The product, 1-[2-(N-ethyl-N-2-hydroxyethylamino)ethylamino]-4-methylxanthone, as the hydrochloride, melted at 178.1–181.5° C. (cor.) when recrystallized from absolute ethanol.

Anal. calcd. for $C_{20}H_{24}N_2O_3 \cdot HCl$: Cl, 9.41; N, 7.43. Found: Cl, 9.67; N, 7.29.

EXAMPLE 11

A. 2-(N-ethyl-N-2-hydroxypropylamino)ethylamine

This preparation was carried out according to the directions given hereinabove in Example 2B, but using 125 g. of 2-bromoethylphthalimide, 102 g. of N-ethyl-N-2-hydroxypropylamine and 300 ml. of dry xylene, with a reflux period of seven hours. The product, 2-(N-ethyl-N-2-hydroxypropylamino)ethylamine, boiled at 102–103° C. at 8.0 mm.

Anal. calcd. for $C_7H_{18}N_2O$: N, 19.15. Found: N, 18.68.

B. 1-[2-(N-ethyl-N-2-hydroxypropylamino)-ethylamino]-4-methyl-6-chloroxanthone This preparation was carried out following the procedure described above in Example 1C, but using 7.0 g. of 1,6-dichloro-4-methylxanthone, 6.0 g. of 2-(N-ethyl-N-2-hydroxypropylamino)-ethylamine and 6.0 ml. of dry pyridine. The product, 1-[2-(N-ethyl-N-2-hydroxypropylamino)ethylamino]-4-methyl-6-chloroxanthone, in the form of the hydrochloride, melted at 169.7–172.7° C. (cor.) (sintered at 154° C.) when recrystallized from absolute ethanol.

Anal. calcd. for $C_{21}H_{25}ClN_2O_3 \cdot HCl$: N, 6.59; Cl, 16.68. Found: N, 6.71; Cl, 16.89.

EXAMPLE 12

A. 2-(2-hydroxybutylamino)ethylamine

The general procedure of Kitchen and Pollard [J. Org. Chem. 8, 342 (1943)] was followed. Twenty-seven grams of 1,2-epoxybutane was added dropwise with stirring to 135 g. of ethylenediamine which was heated to 60° C. After all the oxide had been added, the mixture was heated to 75° C., held there three hours and then distilled. There was recovered 108 g. of ethylenediamine. The product, 2-(2-hydroxybutylamino)ethylamine, boiled at 102° C. (3 mm.) and weighed 36.3 g.

Anal. calcd. for $C_6H_{16}N_2O$: N, 21.20. Found: N, 20.70.

B. *1 - [2-(2-hydroxybutylamino)ethylamino]-4-methyl-6-chloroxanthone*

This preparation was carried out following the procedure described in Example 1C, but using 6.0 g. of 1,6-dichloro-4-methylxanthone, 6.0 g. of 2-(2-hydroxybutylamino)ethylamine and 6.0 ml. of dry pyridine. The product, 1-[2-(2-hydroxybutylamino)ethylamino]-4-methyl - 6 - chloroxanthone, as the hydrochloride, melted at 239-244.0° C. (cor.) when recrystallized from absolute ethanol-absolute ether.

Anal. calcd. for $C_{20}H_{23}ClN_2O_3 \cdot HCl$: N, 6.81; Cl, 17.04. Found: N, 6.75; Cl, 17.04.

Other 1 - [2 - (2-hydroxybutylamino)ethylamino]-4-methyl-6-substituted - xanthones can be prepared according to the above procedure, using other 1 - chloro-4-methyl-6-substituted-xanthones in place of 1,6-dichloro-4-methylxanthone. For example, 1-[2-(2-hydroxybutylamino)ethylamino]-4-methyl - 6 - methoxyxanthone hydrochloride and 1-[2-(2-hydroxybutylamino)ethylamino] - 4,6 - dimethylxanthone hydrochloride are formed using 1-chloro-4-methyl-6-methoxyxanthone and 1-chloro-4,6-dimethylxanthone, respectively.

EXAMPLE 13

*1-[2-(2-hydroxypropylamino)ethylamino]-4-methylxanthone*

This preparation was carried out following the procedure described above in Example 1C, but using 6.0 g. of 1-chloro-4-methylxanthone, 6.0 g. of 2-(2-hydroxypropylamino)ethylamine and 6.0 ml. of dry pyridine. The product, 1-[2-(2 - hydroxypropylamino)ethylamino]-4-methylxanthone, as the hydrochloride, melted at 203.6–205.0° C. (cor.) when recrystallized from absolute ethanol.

Anal. calcd. for $C_{19}H_{22}N_2O_3 \cdot HCl$: C, 62.89; H, 6.39; N, 7.72. Found: C, 63.14; H, 6.67; N, 7.98.

EXAMPLE 14

*1 - [2 - (2 - hydroxy - 2 - methylpropylamino)-ethylamino]-4-methyl-6-chloroxanthone*

This preparation was carried out following the procedure described above in Example 1C, but using 7.0 g. of 1,6-dichloro-4-methylxanthone, 7.0 g. of 2-(2-hydroxy-2-methylpropylamino)-ethylamine and 6.0 ml. of dry pyridine. The product, 1 - [2 - (2 - hydroxy - 2 - methylpropylamino)ethylamino] - 4 - methyl - 6 - chloroxanthone, as the hydrochloride, melted at 254.2–254.8° C. (cor.)

Anal. calcd. for $C_{20}H_{24}ClN_2O_3 \cdot HCl$: C, 58.40; H, 5.88; N, 6.81. Found: C, 58.70; H, 5.77; N, 6.84.

EXAMPLE 15

*1 - [2 - (2 - hydroxy - 2 - methylpropylamino)-ethylamino]-4-methylxanthone*

This preparation was carried out following the procedure described above in Example 1C, but using 6.5 g. of 1-chloro-4-methylxanthone, 6.5 g. of 2 - (2 - hydroxy - 2 - methylpropylamino)ethylamine and 6.0 ml. of dry pyridine. The product, 1 - [2 - (2 - hydroxy - 2 - methylpropylamino)-ethylamino]-4-methylxanthone, as the hydrochloride, melted at 220.0–221.5° C. (cor.)

Anal. calcd. for $C_{20}H_{24}N_2O_3 \cdot HCl$: C, 63.73; H, 6.69; N, 7.43. Found: C, 63.57; H, 6.57; N, 7.23.

EXAMPLE 16

*1 - [2 - (2 - hydroxypropylamino)ethylamino]-4-methyl-6-chloroxanthone*

This preparation was carried out following the procedure described above in Example 1C, but using 6.0 g. of 1,6-dichloro-4-methylxanthone, 6.0 g. of 2-(2-hydroxypropylamino)ethylamine and 6.0 ml. of dry pyridine. The product, 1-[2-(2-hydroxypropylamino)ethylamino] - 4 - methyl-6-chloroxanthone, as the hydrochloride, melted at 227–230° C. (cor.) when recrystallized from absolute ethanol.

Anal. calcd. for $C_{19}H_{21}ClN_2O_3 \cdot HCl$: C, 57.44; H, 5.58; N, 7.05. Found: C, 57.30; H, 5.73; N, 7.07.

EXAMPLE 17

*1 - [2 - (2 - hydroxybutylamino)ethylamino]-4-methylxanthone*

This preparation was carried out following the procedure described above in Example 1C, but using 6.0 g. of 1-chloro-4-methylxanthone, 6.0 g. of 2-(2-hydroxybutylamino)ethylamine and 6.0 ml. of dry pyridine. The product, 1-[2-(2-hydroxybutylamino)ethylamino] - 4 - methylxanthone, as the hydrochloride, melted at 191.0–191.6° C. (cor.) when recrystallized twice from absolute ethanol and once from absolute ethanol-absolute ether.

Anal. calcd. for $C_{20}H_{24}N_2O_3 \cdot HCl$: C, 63.73; H, 6.69; N, 7.43. Found: C, 64.02; H, 6.57; N, 7.53.

I claim:

1. A xanthone having the formula

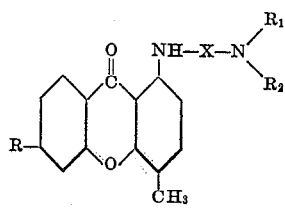

where R is a member of the group consisting of hydrogen, halo groups, lower alkyl radicals and lower alkoxy radicals, X is a lower alkylene radical having its two connecting linkages on adjacent carbon atoms, $R_1$ is a member of the group consisting of hydrogen and lower alkyl radicals and $R_2$ is a lower 2-hydroxyalkyl radical.

2. A compound according to claim 1 where R is halogen and $R_1$ is a lower alkyl radical.

3. A compound according to claim 1 where R and $R_1$ are each lower alkyl radicals.

4. A compound according to claim 1 where R is a lower alkoxy radical and $R_1$ is a lower alkyl radical.

5. A compound according to claim 1 where R is halogen and $R_1$ is hydrogen.

6. A xanthone having the formula

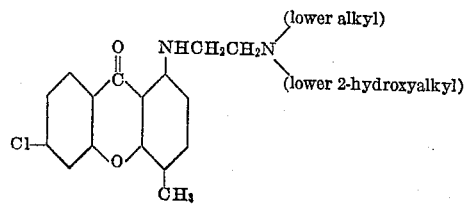

7. A xanthone having the formula

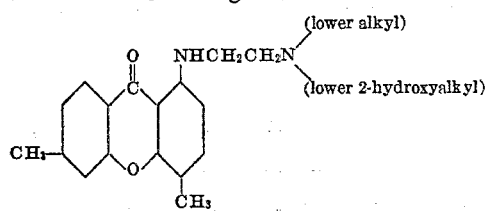

8. A xanthone having the formula

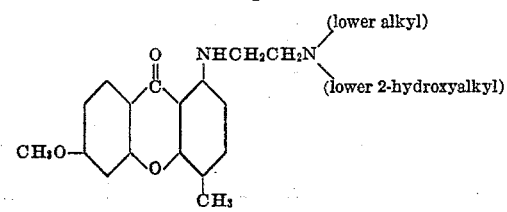

9. A xanthone having the formula

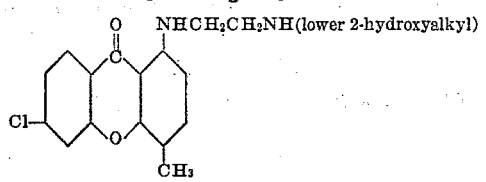

10. 1 - [2 - (N - ethyl - N - 2 - hydroxy - 2-methylpropylamino)ethylamino] - 4 - methyl - 6-chloroxanthone.

11. The process of preparing a xanthone having the formula

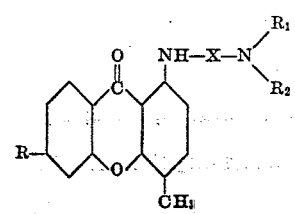

where R is a member of the group consisting of hydrogen, halo groups, lower alkyl radicals and lower alkoxy radicals, X is a lower alkylene radical having its two connecting linkages on adjacent carbon atoms, $R_1$ is a member of the group consisting of hydrogen and lower alkyl radicals and $R_2$ is a lower 2-hydroxyalkyl radical, which comprises heating a 1-halo-4-methyl-6-R-xanthone with a diamine having the formula, $R_1R_2N-X-NH_2$.

12. A process according to claim 11 where R is halogen and $R_1$ is a lower alkyl radical.

13. A process according to claim 11 where R and $R_1$ are each lower alkyl radicals.

14. A process according to claim 11 where R is a lower alkoxy radical and $R_1$ is a lower alkyl radical.

15. A process according to claim 11 where R is halogen and $R_1$ is hydrogen.

16. A process of preparing 1-[2-(N-ethyl-N-2-hydroxy - 2 - methylpropylamino)ethylamino]-4-methyl-6-chloroxanthone, which comprises heating 1,6-dichloro-4-methylxanthone with 2-(N - ethyl - N - 2 - hydroxy - 2 - methylpropylamino)ethylamine.

17. 1 - [2 - (N - ethyl - N - 2 - hydroxyethylamino)ethylamino] - 4 - methyl - 6 - chloroxanthone.

18. 1 - [2 - (N - ethyl - N - 2 - hydroxyethylamino)ethylamino] - 4,6 - dimethylxanthone.

19. 1 - [2 - (N - ethyl - N - 2 - hydroxyethylamino)ethylamino] - 4 - methyl - 6 - methoxyxanthone.

20. 1 - [2 - (2 - hydroxy - 2 - methylpropylamino(ethylamino] - 4 - methyl - 6 - chloroxanthone.

SYDNEY ARCHER.

No references cited.